Nov. 15, 1960  G. B. SMITH ET AL  2,959,883

FISH LURE

Filed Oct. 2, 1958

INVENTORS
GERALD B. SMITH
JAMES A. SMITH
BY
ATTORNEY

United States Patent Office 2,959,883
Patented Nov. 15, 1960

2,959,883

FISH LURE

Gerald B. Smith, Menasha, Wis. (21 Carobene Court, Apt. 1B, Newburgh, N.Y.), and James Allen Smith, 424 6th St., Neenah, Wis.

Filed Oct. 2, 1958, Ser. No. 764,870

2 Claims. (Cl. 43—42.5)

This invention relates to artificial fish lures.

The purpose of this invention is to provide a new and novel fish lure.

An object of this invention is the provision of a fish lure having its end portions recurved.

Another object is to provide a fish lure having a fish hook securing eye mounted on the trailing side of a recurved end portion.

Still another object of this invention is the provision of a fish lure having spaced openings on the longitudinal axis thereof.

Yet another object is to provide a fish lure having openings in recurved end portions thereof.

A further object of this invention is the provision of a fish lure having oppositely extending lugs on the longitudinal axis thereof.

Still a further object is to provide a fish lure having lugs extending diagonally over openings.

Yet a further object of this invention is the provision of a fish lure that is simple, strong and durable, and inexpensive to manufacture.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein.

Figures 1, 2, 3:
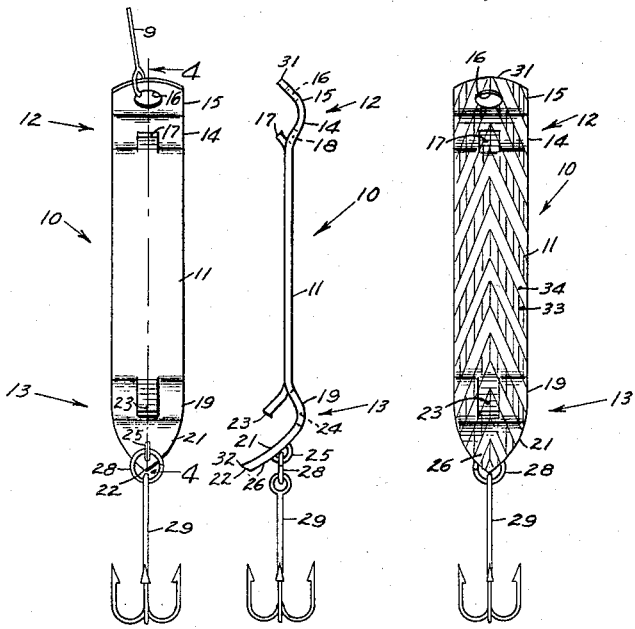
Fig. 1 is a front elevation view of the invention.
Fig. 2 is a side view of Fig. 1.
Fig. 3 is a back elevation view of the invention shown in Fig. 1.
Figure 4:
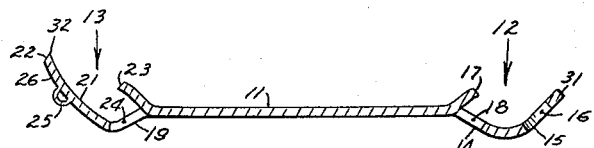
Fig. 4 is a longitudinal section view taken along line 4—4 of Fig. 1.

Referring now to the drawings, wherein like reference characters designate like or corresponding parts throughout the several views, there is shown a fish lure generally indicated at 10 comprising a flat elongated body portion 11 having recurved head and tail end portions generally indicated at 12 and 13, respectively.

The recurved head end portion 12 of the fish lure is curved backwardly as at 14 and then frontally as at 15 thereby forming said recurved head end 11 configuration. The frontally curved section 15 extends slightly beyond the plane of the body portion 11.

An aperture 16 is provided in said frontally curved section 15 through which a fish line 9 can be threaded for securing a fish line to said fish lure. Obviously any other equivalent or conventional type of fish line securing means can be provided on said frontally curved section 15.

A rectangularly configured lug 17 is provided by pressing such lug 17 from material comprising the backwardly curved section 14. Said lug remains integrally connected to the body 11 along one of its edges, and is disposed diagonally frontally and extends forwardly over the opening 18 from which said lug was cut and pressed. Said lug extends from the point of tangency of the backwardly curved section 14 and the elongated body 11, or approximately or substantially therefrom. Though not limited thereto, favorable results have been achieved by having said lug disposed at an angle of about thirty-five degrees.

The recurved tail end portion 13 of the fish lure is curved backwardly as at 19 and then frontally as at 21 thereby forming said recurved tail end 13 configuration. The frontally curved section 21 extends beyond the plane of the body 11, and substantially farther than the extension of frontally curved section 15 of the head end 12. Said frontally curved section 21 is provided with sharp edged convergent sides and terminating in a knife edge 22, said section 21 extending substantially beyond the extension of lug 23 hereinafter described.

A rectangularly configured lug 23 is provided by pressing such lug 23 from material comprising the backwardly curved section 21. Said lug remains integrally connected to the body 11 along one of its edges, and is disposed diagonally frontally and extends rearwardly over the opening 24 from which said lug was cut and pressed. Though not limited thereto, favorable results have been achieved by having said lug disposed at an angle of about forty-five degrees. Said lug 23 extends from the point of tangency of the backwardly curved section 19 and the elongated body 11, or approximately or substantially therefrom.

Figure 5:
Fig. 5 is a modification showing a fragmentary section of the tail end of the fish lure illustrating an eyelet pressed from the material comprising the tail portion.

A fish hook securing eye 25 is mounted on the trailing side or surface 26 of the forwardly curved tail section 21. Said hook is mounted on the longitudinal axis of said fish lure, and is disposed on said trailing surface 26 forwardly of the plane of the body 11. Obviously, any type of fish hook securing means can be used such as an eyelet 27 pressed from the material of the section 21 as shown in Fig. 5.

An expandable ringlet such as split ringlet 28 is engaged in eye 27 and it likewise engages a gang fish hook 29.

Relatively speaking the recurved head end 12 projects backwardly of the plane of the body 11 a greater distance than the recurved tail end 13; and the recurved tail section 21 projects frontally a greater distance than the recurved head section 15.

The lug 17 and the head tip end 31 extend frontally of the plane of the body 11 substantially the same amount; whereas lug 23 extends slightly therebeyond yet substantially short of the tail tip end 32.

The back side of said fish lure is painted with alternate red and white V-shaped areas as indicated at 33 and 34, respectively.

Some characteristic features of this invention are the provision of a fish lure that has its end portions recurved; that has a fish hook securing eye on the trailing side of a recurved end portion; that has openings in recurved end portions; that has diagonally disposed lugs adjacent recurved end portions; and that has lugs extending diagonally over openings in the recurved ends.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A fish lure, comprising: an elongated flat body having substantially similarly recurved head end and tail end portions, each recurved portion comprising a backwardly curved section and a terminal frontally curved section, the frontally curved section on the head end extending beyond the plane of said body and terminating arcuately and being provided with an aperture for the securing of a fish line thereto, and the frontally curved section on the tail end having sharp edged convergent sides terminating in a knife edge, said frontally curved section on said tail end extending substantially beyond the plane of said body and also beyond said frontally curved section on said head end; a fish hook securing eye mounted on and projecting from the trailing surface of the frontally curved section of said tail end, said eye being disposed on said trailing surface substantially on the longitudinal axis of said fish lure and forwardly of the plane of said body; a first substantially rectangular opening in the backwardly curved section of said head end and disposed substantially on the longitudinal axis of said fish lure; a first lug, corresponding substantially to the configuration and size of said first opening, connected to the rearward edge of said opening and extending angularly frontally over said first opening; a second substantially rectangular opening in the backwardly curved section of said tail end and disposed substantially on the longitudinal axis of said fish lure; and a second lug, corresponding substantially to the configuration and size of said second opening, connected to the forward edge of said opening and extending angularly frontally over said second opening; said fish lure being substantially symmetrical about its longitudinal axis.

2. The fish lure of claim 1 and fish hook means connected to said fish hook securing means.

References Cited in the file of this patent

UNITED STATES PATENTS

| | | |
|---|---|---|
| D. 185,566 | Pfahler | June 23, 1959 |
| 2,251,593 | Mangle | Aug. 5, 1941 |
| 2,553,149 | Schiffmann | May 15, 1951 |
| 2,829,432 | Haslett | Apr. 8, 1958 |

FOREIGN PATENTS

| | | |
|---|---|---|
| 958,469 | France | Mar. 9, 1950 |

OTHER REFERENCES

Western (Publication) No. 501.